United States Patent
Diamond et al.

(12) 
(10) Patent No.: US 6,721,623 B1
(45) Date of Patent: Apr. 13, 2004

(54) WOODWORKING AND HOME IMPROVEMENT CALCULATOR

(75) Inventors: Michael A. Diamond, Carson City, NV (US); Steven C. Kennedy, Carson City, NV (US); Joel S. Novak, Sudbury, MA (US); Kenneth M. Steiner, Sudbury, MA (US)

(73) Assignee: Construction Master Technologies, Inc., Carson City, NV (US)

(*) Notice: Subject to any disclaimer, the term of this patent is extended or adjusted under 35 U.S.C. 154(b) by 764 days.

(21) Appl. No.: 09/607,687

(22) Filed: Jun. 30, 2000

(51) Int. Cl.⁷ .......................... G06F 19/00; G06F 15/02
(52) U.S. Cl. .................. 700/194; 708/200; 708/142; 33/494; D18/7
(58) Field of Search .................. 700/194; 708/130, 708/137, 141–145, 200; 33/494; D18/7; 341/22

(56) References Cited

U.S. PATENT DOCUMENTS

| | | | | |
|---|---|---|---|---|
| 3,973,113 A | * | 8/1976 | Goldsamt | 708/137 |
| 4,081,859 A | * | 3/1978 | Goldsamt et al. | 708/137 |
| 4,100,603 A | * | 7/1978 | Boyd | 708/673 |
| 4,488,250 A | * | 12/1984 | Lipsey et al. | 708/137 |
| 4,744,044 A | * | 5/1988 | Stover et al. | 708/530 |
| 5,997,475 A | * | 12/1999 | Bortz | 600/300 |

* cited by examiner

*Primary Examiner*—Jayprakash N. Gandhi
(74) *Attorney, Agent, or Firm*—Sierra Patent Group, Ltd.

(57) ABSTRACT

The specification discloses a woodworking and home improvement calculator particularly adopted for symplifying common home improvement calculations. The calculator includes a variety of special keys including a gravel, cement, tile, brick, block, 4×8 sheet, paint, wallpaper, stud and roof bundle keys which allow the user to quickly determine the amount of materials needed for projects involving the aforementioned keys.

33 Claims, 16 Drawing Sheets

WOODWORKING AND HOME IMPROVEMENT CALCULATOR

This application is submitted in the name of inventors Michael A. Diamond, Steven C. Kennedy, Joel S. Novak and Kenneth M. Steiner assignors to Calculated Industries, Inc., a Nevada Corporation.

BACKGROUND OF THE INVENTION

1. Field of the Invention

The present invention relates to calculators, and more particularly to calculators especially adapted to perform calculations and conversions of dimensional data for woodworking and home improvement.

2. The Prior Art

Many calculators have been developed to perform calculations on dimensional data. One such calculator is the Construction Master IV manufactured by Calculated Industries, Inc. of Carson City, Nev. However this calculator is targeted to construction professionals and is focused towards the necessary calculations those individuals must make in estimating and bidding complex construction projects.

Various dimensional calculators are illustrated in U.S. Pat No. 4,744,044, issued May 10, 1988 to Stoker et al, entitled HAND HELD CALCULATOR FOR DIMENSIONAL CALCULATIONS; U.S. Pat. No. 4,488,250, issued Dec. 11, 1984 to Lipsey et al, entitled HAND HELD CALCULATOR FOR PERFORMING CALCULATIONS IN FEET, INCHES AND FRACTIONS; U.S. Pat. No. 4,100,603, issued Jul. 11, 1978, to Boyd, entitled FEET, INCHES AND SIXTEENTHS ADDER; U.S. Pat. No. 4,081,859, issued Mar. 28, 1978, to Goldsamt et al, entitled ELECTRONIC CALCULATOR FOR FEET-INCH-FRACTION NUMERICS; and U.S. Pat. No. 3,973,113, issued Aug. 3, 1976, to Goldsamt et al, entitled ELECTRONIC CALCULATOR FOR FEET-INCH-FRACTION NUMERICS. However, none of the above the above are focussed on simplifying calculations specifically for the do it yourselfer.

SUMMARY OF THE INVENTION

The aforementioned problems are overcome in the present invention comprising a calculator particularly adapted for easily and rapidly performing calculations for typical home improvement projects. The calculator includes multiple material conversions dealing with a variety of home projects. The conversions include: gravel, tile, brick, block, 4×8 sheets, paint, wallpaper, board feet, stud spacing and roofing. Further objects and advantages of the invention will become apparent from a consideration of the drawings and the ensuing description.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Figure 1:
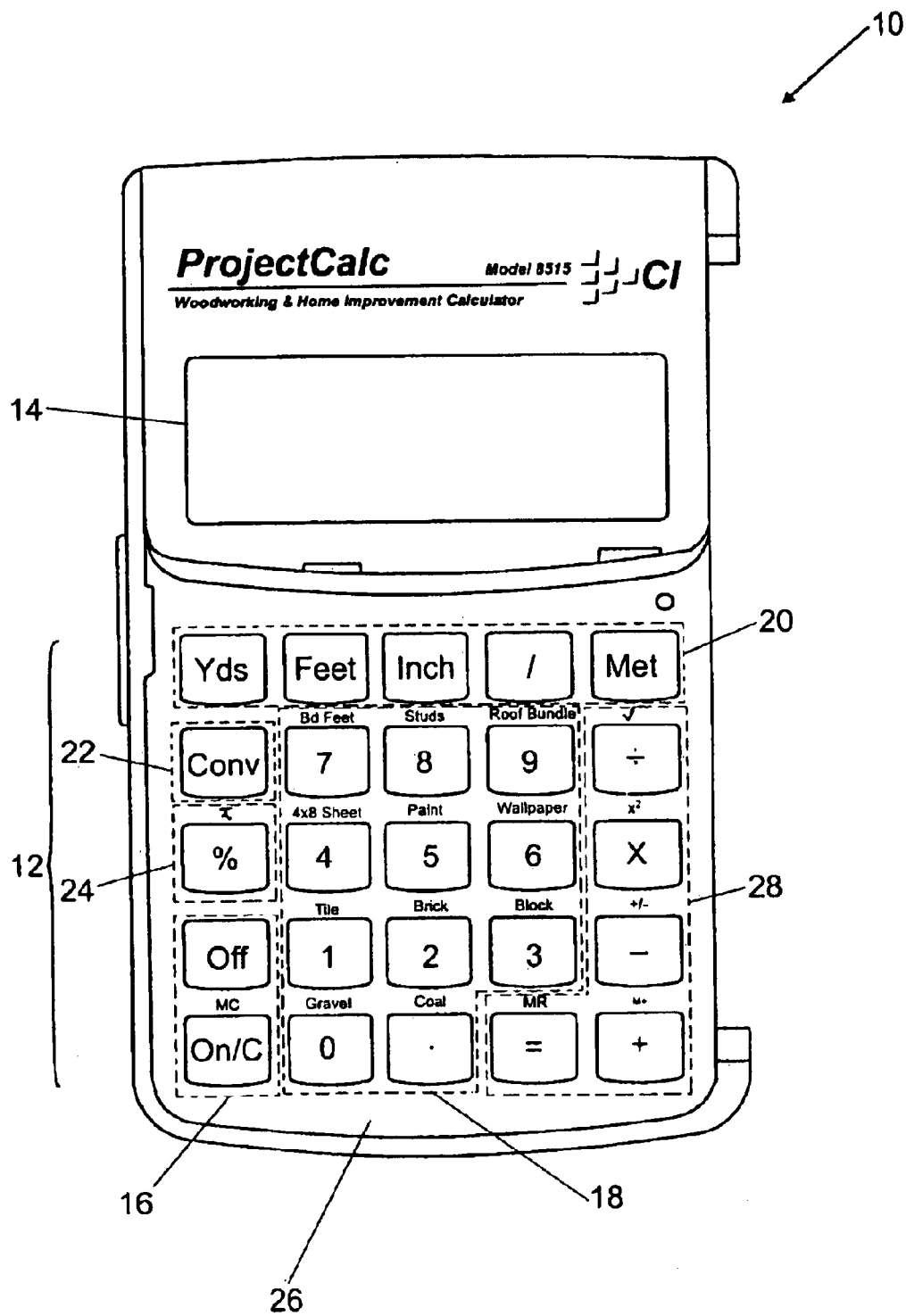
FIG. 1 is a plain view of the calculator keyboard and display.

A calculator constructed in accordance with a preferred embodiment of the invention is illustrated in FIG. 1 and generally designated 10. The calculator includes a keyboard or other input means 12 and a display or other display means 14.

I. KEYBOARD

The keyboard 12 includes several groups of keys including power and clear keys 16, numeric keys 18, measurement keys 20, a conversion key 22, and a percentage key 24. Secondary functions are accessed through the numeric keys 18 and are displayed on the calculator housing 26.

The power/clear keys 16 are conventional and are used to turn the calculator on and off and to clear the display and/or clear memory. The [On/C] or On/Clear Key turns power on. Pressing once clears the display. Pressing twice clears all temporary values. The [Off] or Off key turns all power off, clearing all non-permanent registers. The numeric keys 18 are conventional and used to input numeric information and include the conventional numeric keys 0–9 and a decimal point (.).

Dimensional keys 20 are conventional and are used to label or convert entered values into appropriate dimensional values. To label a dimension as "square" or "cubic," the value is entered and then the desired key is pressed twice to square and three times to cube. For example, to enter 25 cubic yards, the user presses 25 [Yds] [Yds] [Yds]. To enter 25 square feet, the user presses 25 [Feet] [Feet]. The yard [Yds] key (as stated) enters or converts to yards. The feet [Feet] key enters or converts to feet as whole or decimal numbers. This key is also used with the [Inch] and [/] keys for entering Feet-Inch values (e.g., 6 [Feet] 9 [Inch] 1 [/] 2). Arithmetic operation keys 28 and their secondary conversion function labeled on the housing above the keys are conventional and are used to engage in conventional calculator functions such as addition, multiplication, subtraction and division. The secondary functions include squaring input numbers, taking the square root, changing the value to + or − as well as recalling memory values "MR" and adding values to memory "M+."

The Inch [Inch] key enters of converts to inches. Entry can be whole or decimal numbers. This key can also be used with the [/] key for entering fractional inch values (e.g., 9 [Inch] 1 [/] 2). Repeated presses during conversions toggle between fractional and decimal inches. The Meter [Met] key enters or converts to meters. The fraction bar [/] key is used to enter fractions. Fractions can be entered as proper (½, ⅛, 1/16) or improper (3/2, 9/8). The calculator is set to display fractional values to the nearest 16th of an inch. 1/64 resolution can be displayed by pressing [/] with the value in the display. The fractional resolution can be permanently set by pressing [Conv][/] with a clear (zero) display. Repeat presses of the [/] key will then revolve through the available settings: 1/16, 1/32, 1/64, ½, ¼ and ⅛.

II. DISPLAY

Figure 2:
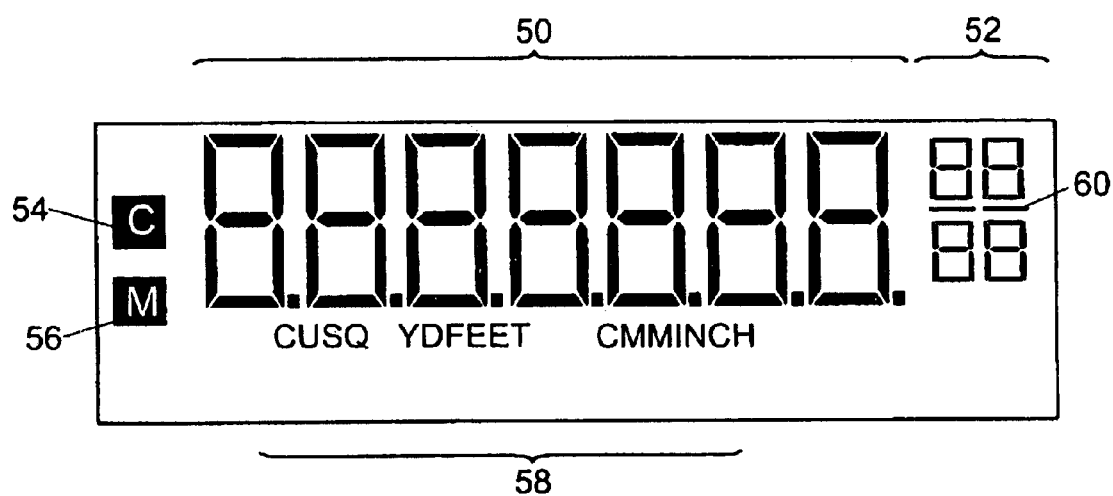
FIG. 2 is an enlarged view of the calculator display showing all of the actual display segments.

The calculator display 14 is illustrated in greater detail in FIG. 2. The display includes a decimal display 50, a fractional display 52, a conversion indicator 54, a memory indicator, 56 and measurement annunciators 58. The preferred decimal display 50 includes seven digits, each comprising a seven-segment display, for displaying a decimal number including a floating decimal point. Other numbers of digits can be included in the display as desired. The fractional display 52 includes a two digit numerator and a two digit denominator separated by a slash 60. The alphabetical display includes four characters, each comprising a fourteen segment display. Activation of the memory display 56 indicates that a number is stored in the independent calculator memory.

The measurement annunciators 58 include the eight indicators or segments "CU" "SQ" "FEET" "YD" "CM" "MM" "M" "INCH." These annunciators 58 are activated in response to depression of measurement keys 20 to indicate measurement system information associated with the displayed number. Specifically, the annunciators 58 can be displayed in the following combinations: YD, FEET, MM, CM, M, INCH, FEET INCHES, SQ YD, SQ FEET, SQ MM, SQ CM, SQ M, SQ INCH, CU YD, CU FEET, CU MM, CU CM, CM and CU INCH. All of the displays 50, 52, 54, 56, 58 and 60 are generally well known to those having ordinary skill in the construction calculator art.

III. OPERATION

The calculator includes conventional circuitry responsive to the keyboard 12 for receiving input and performing calculations. The input number or measurement is displayed on the display 14; and the results of all calculations are also displayed on the display 14. The software for implementing the function of the calculator can be readily prepared by one having ordinary skill in the art in view of the present specification, particularly the flow charts of FIGS. 3–24.

The calculator is "key driven" or "keyboard driven", meaning that the internal operation of the calculator is dependent upon the last key entered. Major branching decisions within the software are made on the basis of the most recent key entry. Numeric input is entered using the numeric keys 18. Additionally, measurement information associated with the numbers can be inputted using the measurement keys 20. The operation of the calculator in modes and functions not described below, will not be described in detail inasmuch as such operation is generally identical to conventional calculators and more specifically prior art construction calculators.

Figure 3:
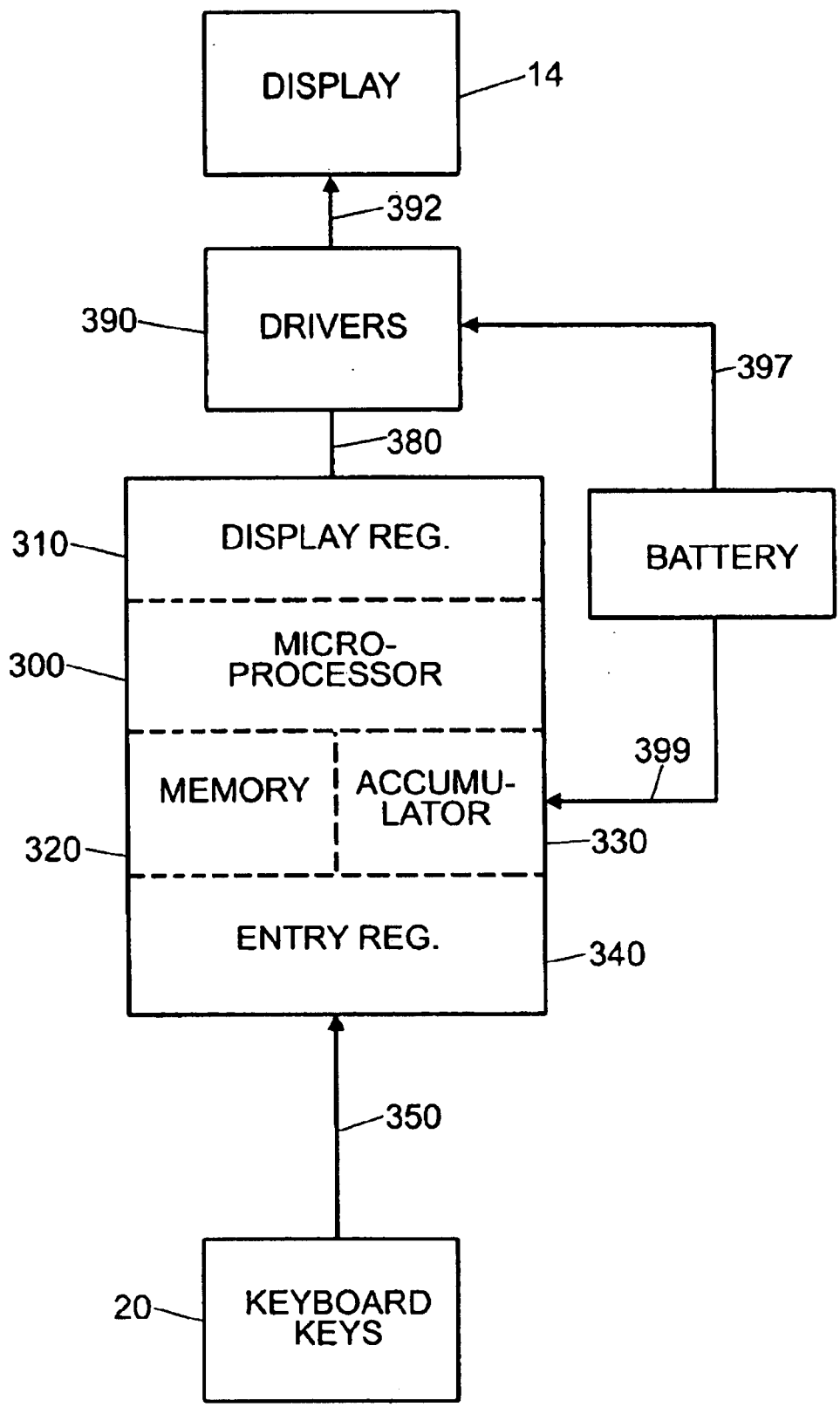
FIG. 3 is a chart showing the basic operation of the calculator.

In FIG. 3, the block diagram circuit arrangement for the calculator of the present invention 10 is set forth. The circuit includes a microprocessor 300 containing a display register 310, a memory 320, an accumulator 330, and an entry register 340. The microprocessor 300 is interconnected over bus 350 to the keyboard keys 20. The microprocessor 300 communicates over bus 380 with drivers 390. The drivers 390 communicate over bus 392 with the display circuit 14. A battery power supply 395 provides power over lines 397 and 399 to the drivers 390 and to the microprocessor 300 respectively. Persons of ordinary skill in the art will readily be able to configure a calculator according to the present invention using commercially available components.

Gravel Function

Figure 4:
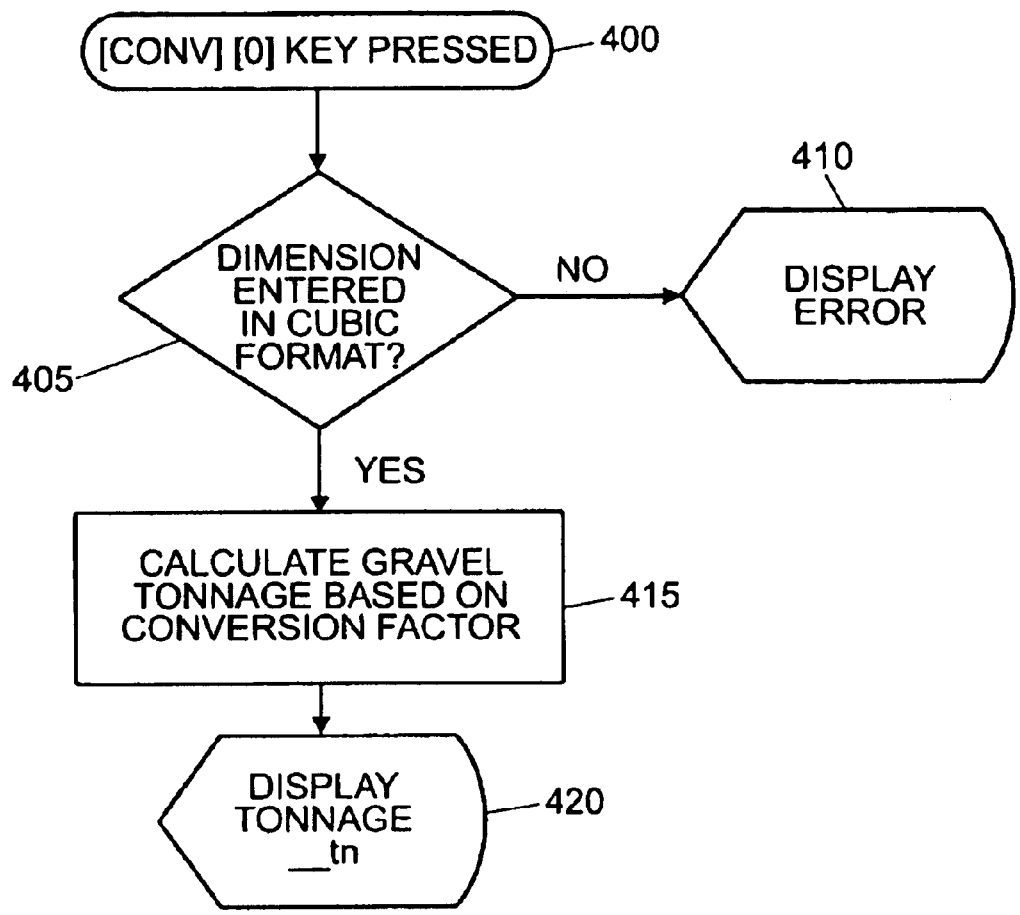
FIG. 4–24 are flowcharts illustrating the operation of the inventive features of the calculator.
Figure 5:
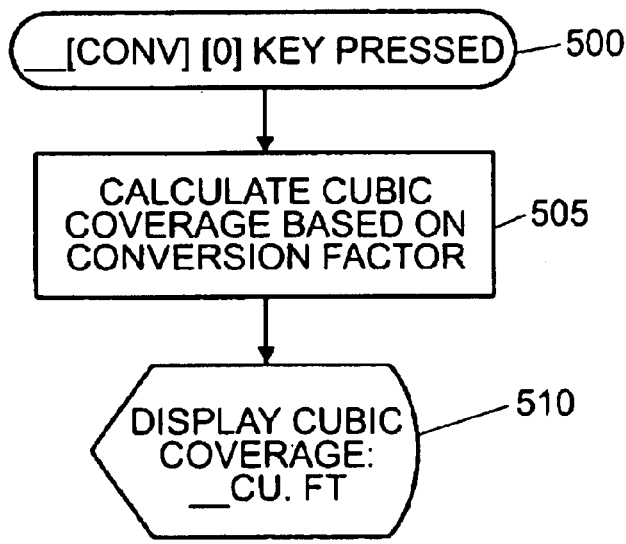

Referencing FIGS. 4 and 5, shown are flowcharts which detail the basic operation of the gravel function. The gravel function is accessed through the [Conv] [0] keys. The user enters (or calculates to) a cubic dimension. Next the [Conv] [0] key is pressed 400. The calculator queries whether the entered dimension is in a cubic format 405. If not, an error message is displayed 410. If the value is properly entered in a cubic format, the calculator converts the entered cubic value to a tonnage value based on a default conversion factor 415. The calculator then displays the appropriate tonnage 420 along with the indicator "tn."

The calculator also calculates the reverse, i.e., an entered tonnage into a corresponding cubic coverage. The user simply enters the number of tons and accesses the gravel function: [Conv] [0] 500. The calculator converts the entered tonnage into a corresponding cubic yard coverage based on the conversion factor 505 and displays the same using the indicator "CU YD" 510. The default conversion factor is 0.77 cu. yards of coverage for one ton of gravel or conversely 1.3 tons equals one cubic yard of coverage.

Concrete Bags/mix Function

Figure 6:
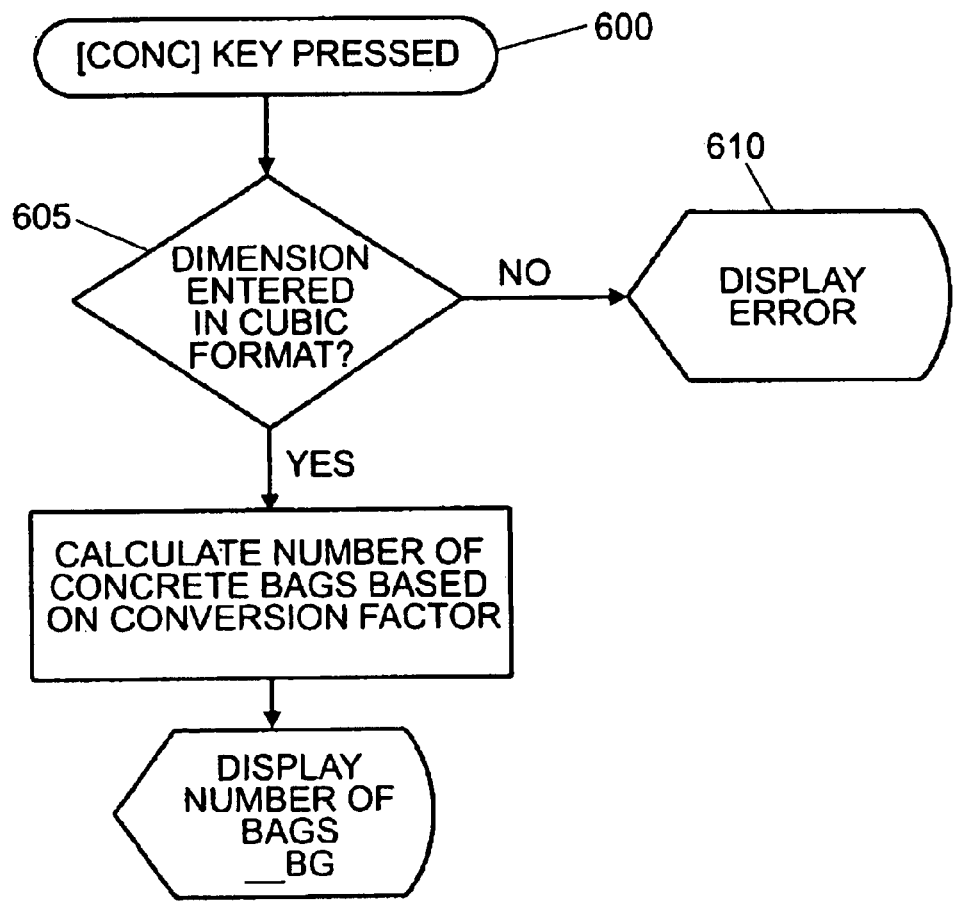
Figure 7:
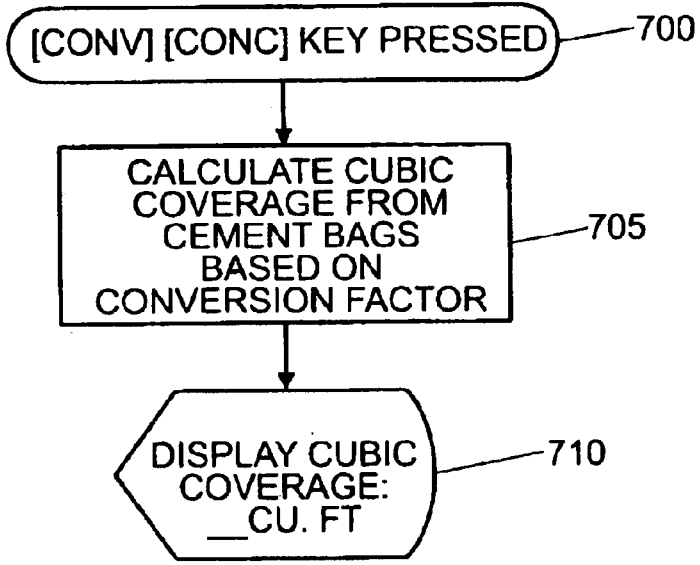

Referencing FIGS. 6 and 7, shown are flowcharts which detail the basic operation of the concrete function. The concrete function is accessed through the [Conv] [0] keys. The user enters (or calculates to) a cubic dimension. Next the [Conv] [0] key is pressed 600. The calculator queries whether the entered dimension is in a cubic format 605. If not, an error message is displayed 610. If the value is properly entered in a cubic format, the calculator converts the entered cubic value to a tonnage value based on a default conversion factor 615. The calculator then displays the appropriate number of cement bags required 420 along with the indicator "bg."

The calculator also calculates the reverse, i.e., an entered number of cement bags into a corresponding cubic coverage. The user simply enters the number of cement bags and accesses the concrete function: [Conv] [0] 700. The calculator converts the entered bags into a corresponding cubic yard coverage based on the conversion factor 705 and displays the same using the indicator "CU YD" 710. The default conversion factor is (NEEDED) cu. yards of coverage for each bag of cement or conversely each cubic yard of coverage requires (NEEDED) bags of cement.

Tile Function

Figure 8:
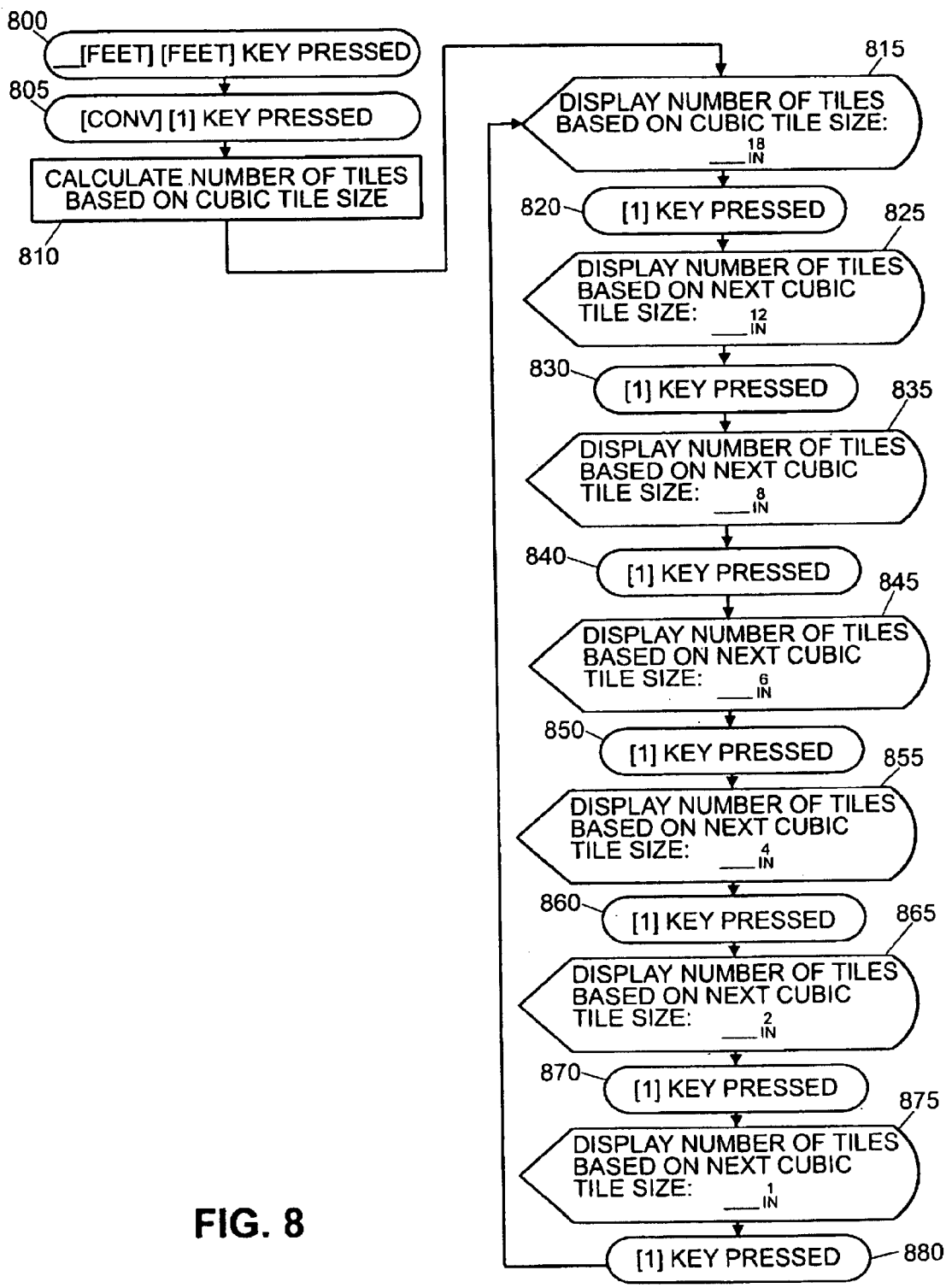
Figure 9:
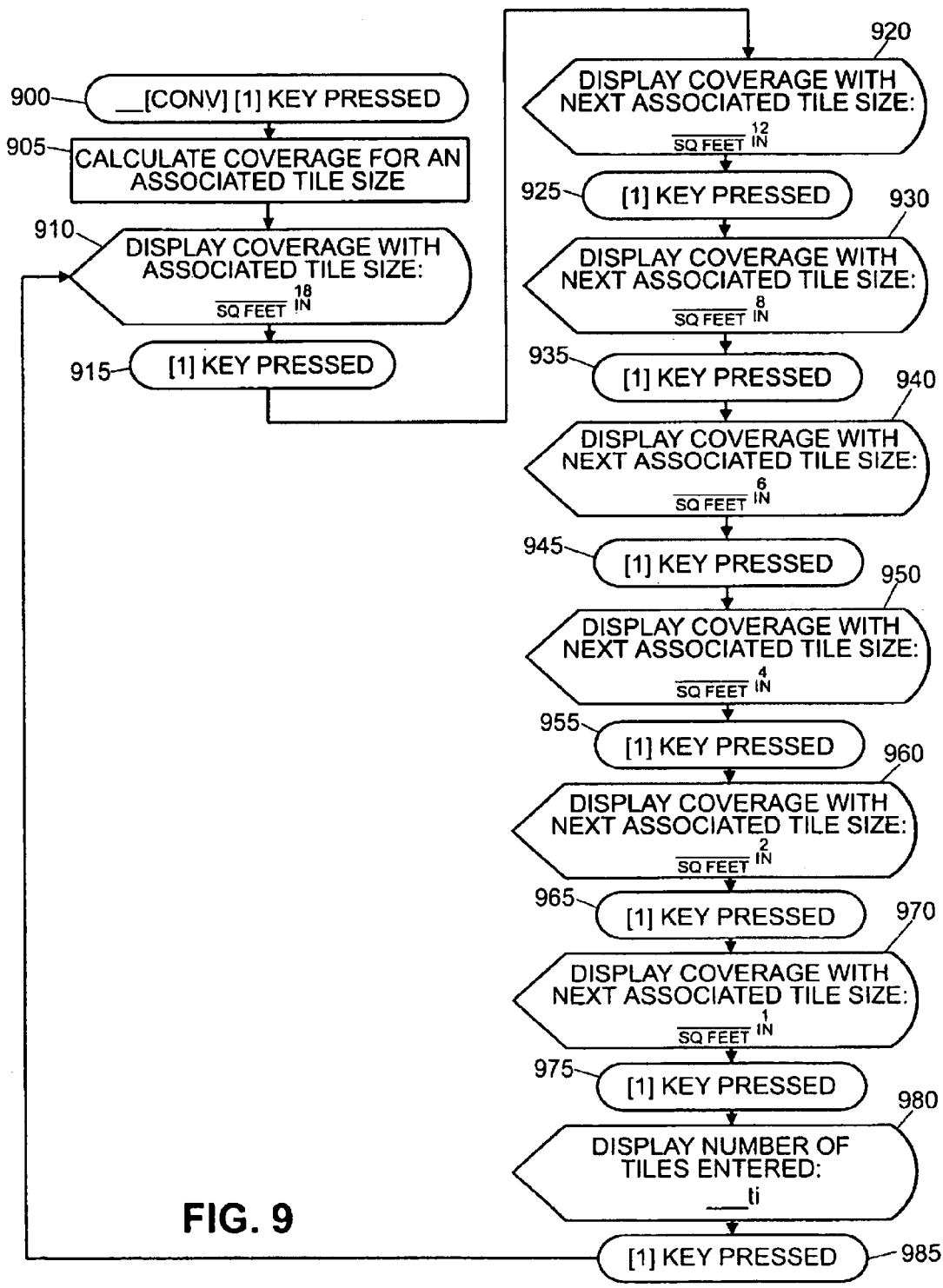
Figure 10:
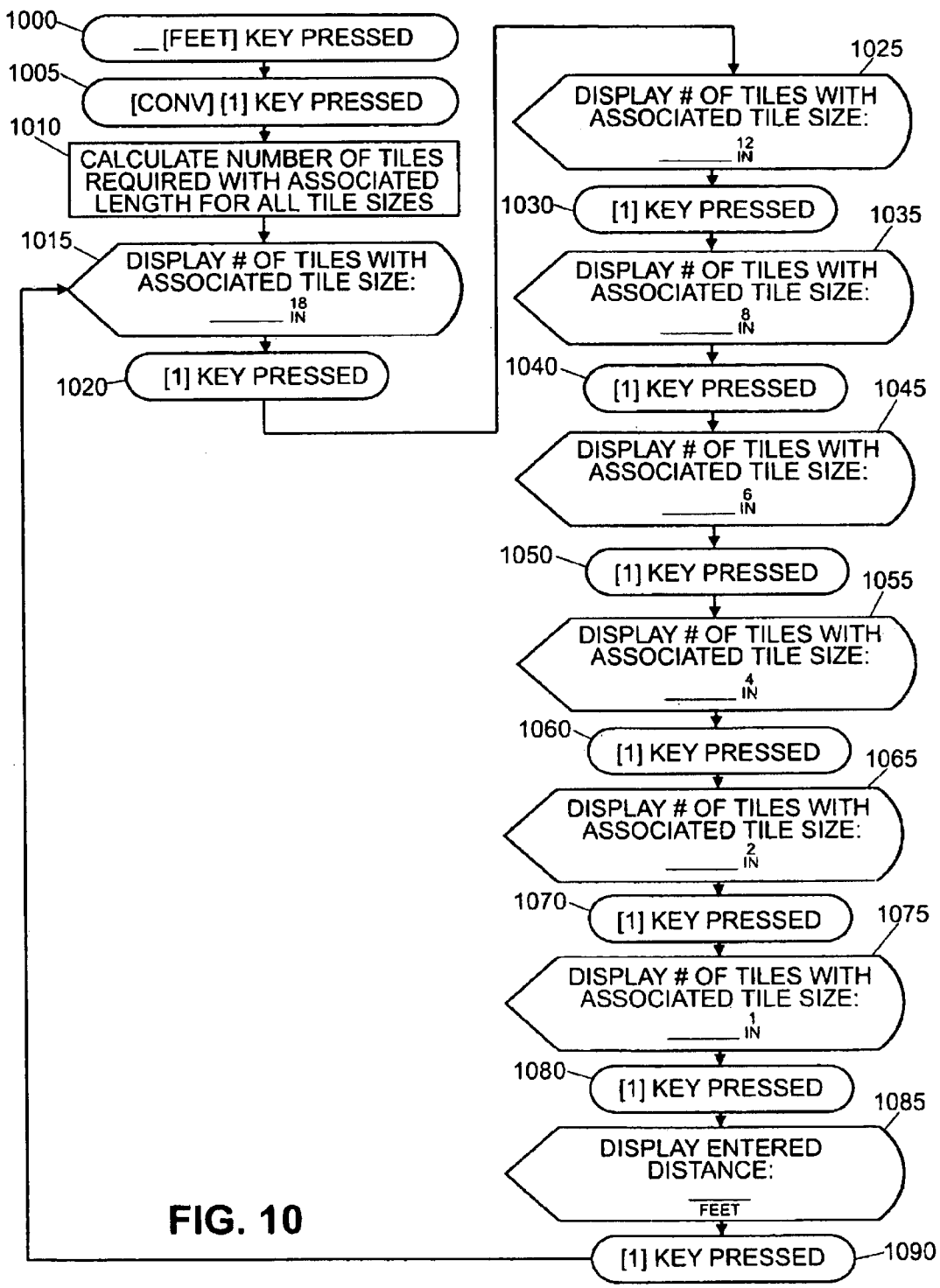

Referencing FIGS. 8, 9 and 10, shown are flowcharts which detail the basic operation of the tile function. The tile function is accessed through the [Conv] [1] keys. The user enters (or calculates to) a squared dimension 800. Next the [Conv] [1] key is pressed 805. The calculator then converts the entered area value to a number of tiles value based on a variety of conversion factors 810. The calculator then displays the appropriate number of 18 inch tiles required 815, along with the indicator "18 in."

Another press of the tile [1] key 820, displays the number of 12 inch tiles required for the same entered area 825 along with the indicator "12 in." Repeated presses of the tile [1] key 830, 840, 850, 860, 870 accesses other conversions, i.e., to 8 inch, 6 inch, 4 inch, 2 inch and 1 inch tiles, 835, 845, 855, 865 and 875 respectively. A subsequent press of the tile [1] key 880, cycles to the top of the information queue 815.

Referring to FIG. 9, the calculator also calculates the reverse, i.e., an entered number of tiles into a into a corresponding square foot coverage. The user simply enters the number of tiles and accesses the tile function: [Conv] [1] 900. The calculator converts the number of entered tiles into a corresponding square foot coverage based on conversion factors 905 and displays the same using the indicator "SQ FEET" along with the tile size associated with the coverage 910. Subsequent presses of the tile key 915, 925, 935, 945, 955 and 965 reveals coverage for additional sizes 920, 930, 940, 950, 960 and 970. An additional press of the tile key 980 reveals the number of tiles input by the user with the designation "ti" 980.

Referring to FIG. 10 the calculator can also calculate linear tile requirements, i.e., the amount of tiles needed for a linear dimension. The user simply enters the linear dimension into the calculator 1000 and accesses the tile function by pressing [Conv] [1] 1005. The calculator then calculates the number of tiles required for the entered length for a variety of tile sizes 1010 and displays the number of tiles associated for the first tile size 1015. Subsequent presses of the tile key 1020, 1030, 1040, 1050, 1060 and 1070 display the remaining information 1025, 1035, 1045, 1055, 1065 and 1075. An additional press of the tile key 1080 displays the entered distance for the user with the linear designation 1085. Another press 1090 simply cycles the calculator to the beginning of the information queue 1015.

Brick and Block Function

Figure 11:
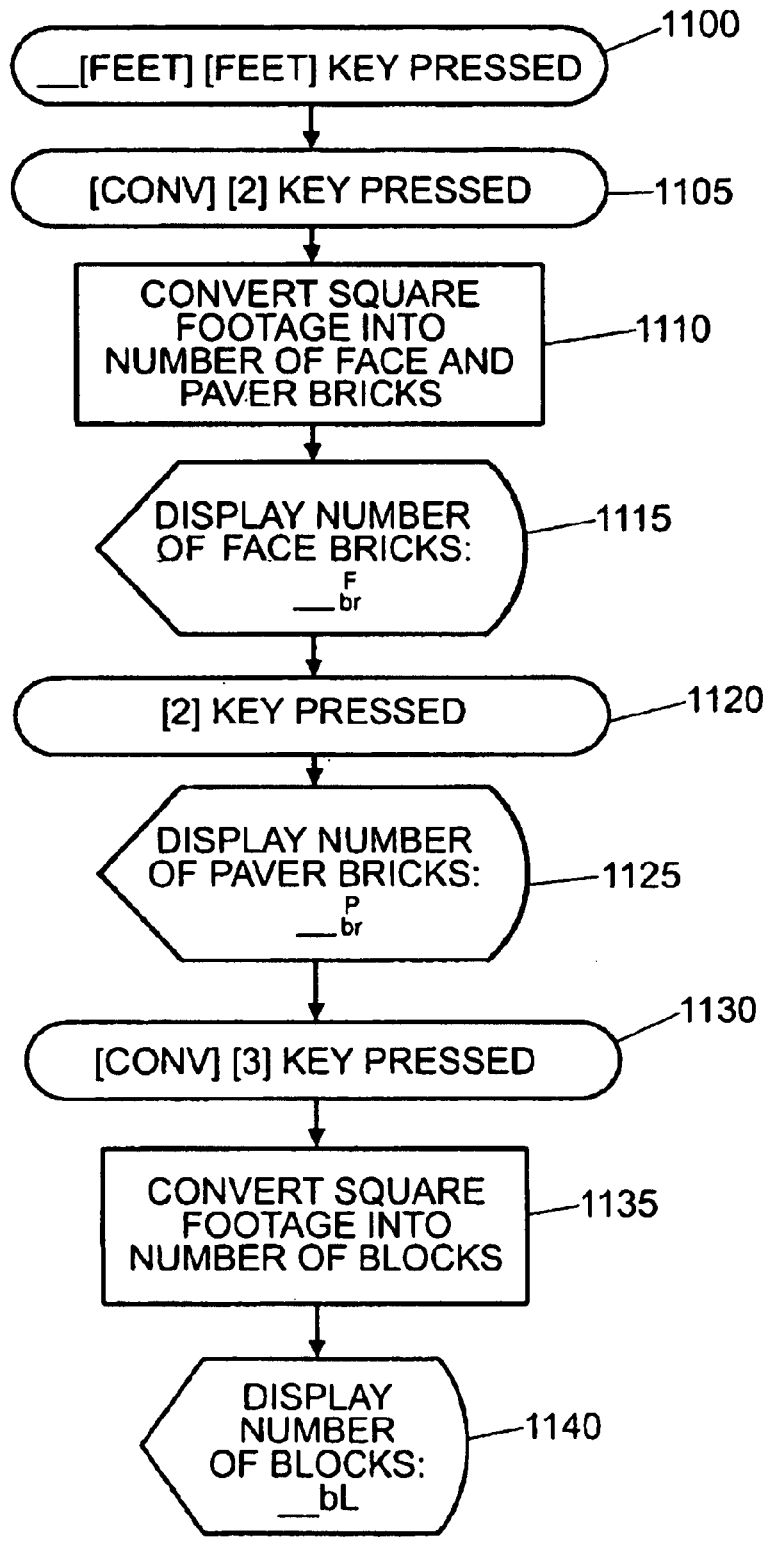
Figure 12:
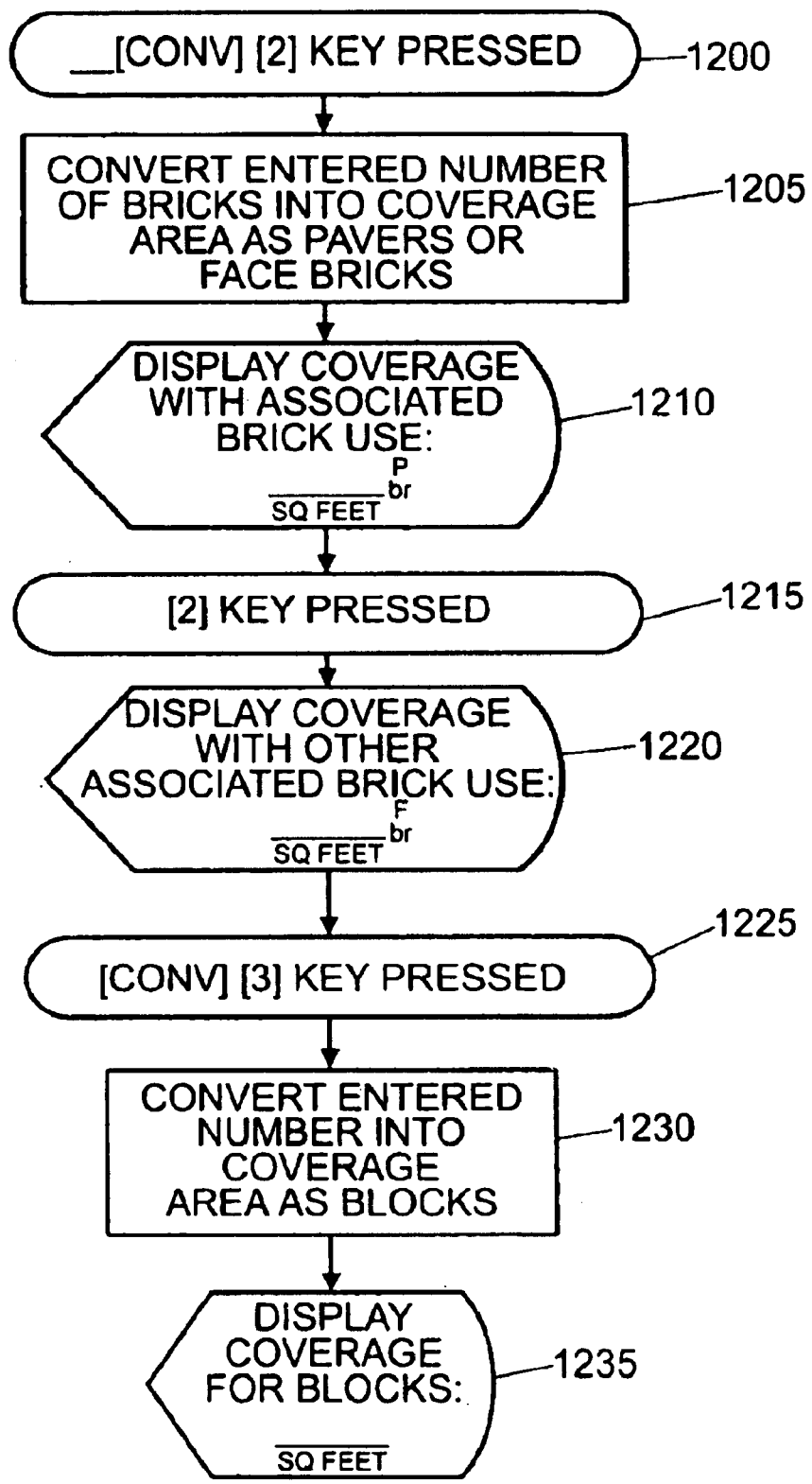
Figure 13:
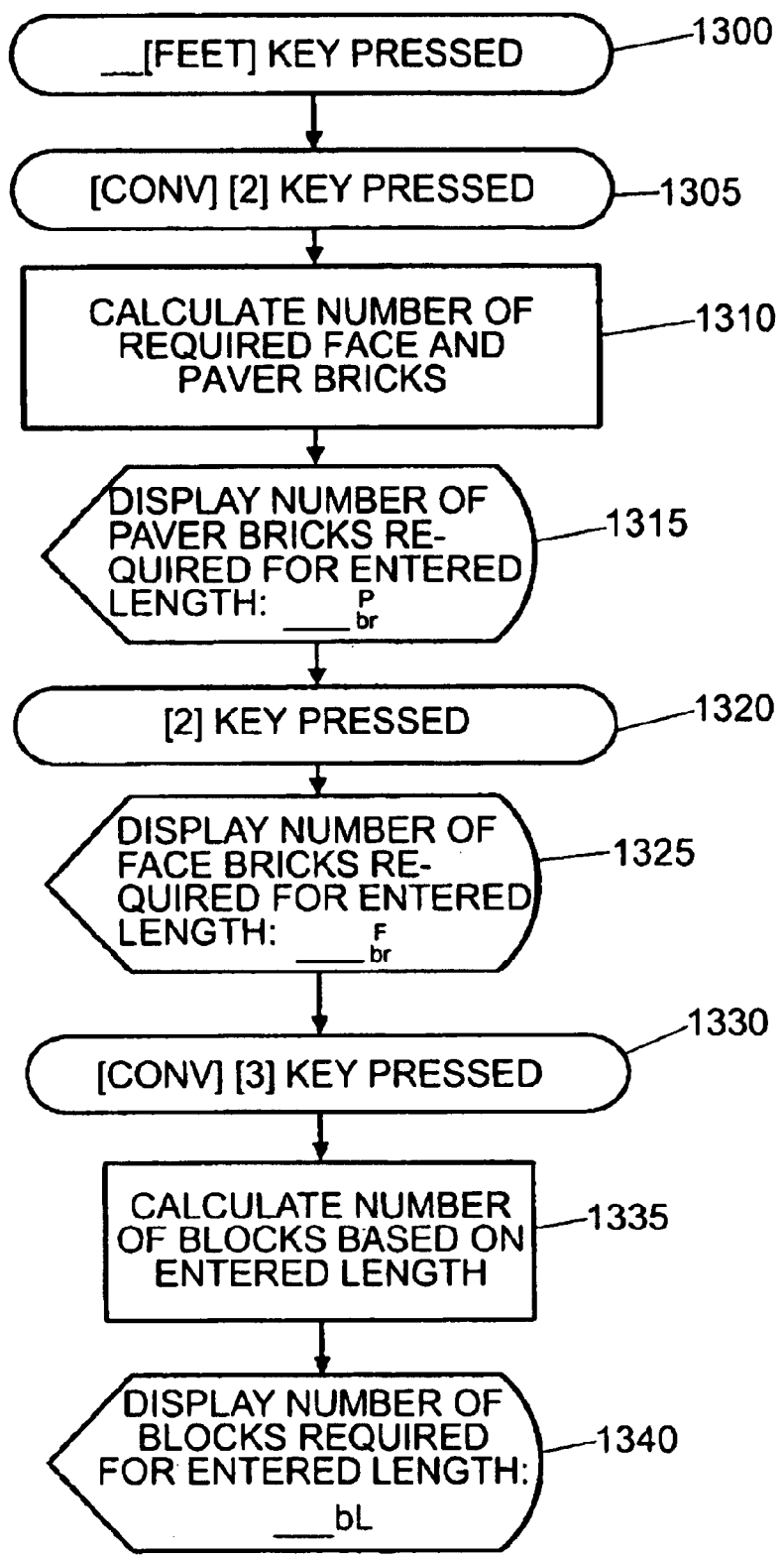

Referencing FIGS. 11, 12 and 13, shown are flowcharts which detail the basic operation of the brick and block functions. Referring to FIG. 11, the brick function is accessed through the [Conv] [2] keys. The user enters (or calculates to) a squared dimension 1100. Next the [Conv] [2] key is pressed 1105. The calculator then converts the entered area value to a number of face and paver bricks based on conversion factors 1110. The calculator then displays the appropriate number of face bricks required 1115, along with the indicator "F br."

Another press of the brick [2] key 1120, displays the number of paver brick required for the same entered area 1125 along with the indicator "P br." The block function can be accessed by pressing [Conv] [3] keys 1130 which then converts the previously entered area into the number of block required 1135 and then displays the calculated number, along with the designation "bL" 1140.

The conversion factors used are 21 square inches of coverage for each face brick and 32 square inches of coverage for paver bricks. This is based on a modular U.S. Brick size of 3-⅝ inches ×2-¼ inches ×7-⅝ inches including ⅜ inches of mortar. The block size is 128 square inches which includes ½ inch of mortar.

Referencing FIG. 12 the calculator can calculate the reverse as well, i.e., the user can enter a number of bricks or blocks and the calculator indicates the coverage said number of bricks or blocks will enjoy. The user enters the number of bricks and presses the [Conv] [2] key 1200. The calculator then converts the entered number of bricks using the above conversion factors into a corresponding area 1205. The calculator then displays the area coverage along with the corresponding brick size: "SQ FEET P br" 1210, the "P" indicating a paver brick. An additional press of the [2] key 1215 displays the coverage with the other associated brick use: "SQ FEET F br" 1220. F indicates face brick. Corresponding block coverage can be accessed by pressing the [Conv] [3] key 1225. The calculator converts the entered number into corresponding block coverage 1230 and displays covered area: "SQ FEET" 1235.

Referencing FIG. 13, corresponding bricks and blocks for an entered linear dimension can be calculated. A linear dimension is input 1300, then the brick function is accessed by pressing the [Conv] [2] key 1305. The calculator then converts the input distance into the required number of face and paver bricks 1310 and displays the paver bricks 1315 with the designation "P br." An additional press of the [2] key 1320, displays the number of face bricks 1325 with the designation "F br." Pressing the [Conv] [3] key 1330 converts the entered length into the number of required blocks 1335 and displays that number 1340 with the designation "bL."

4×8 Sheet Function

Figure 14:
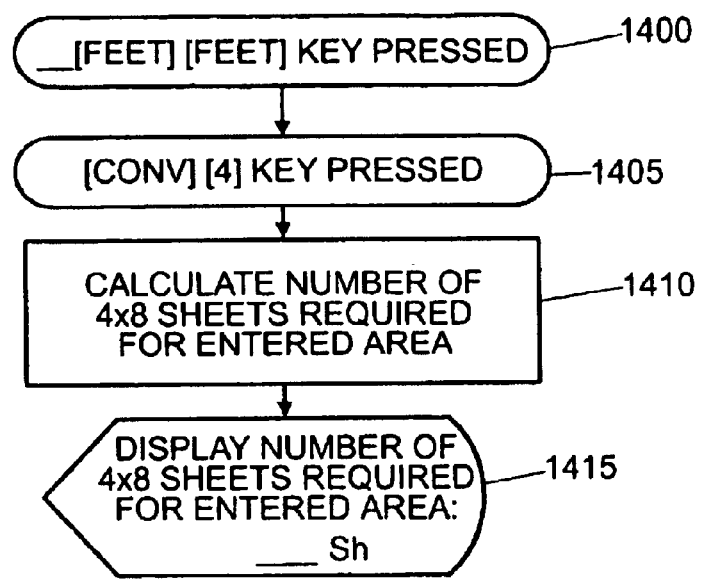
Figure 15:
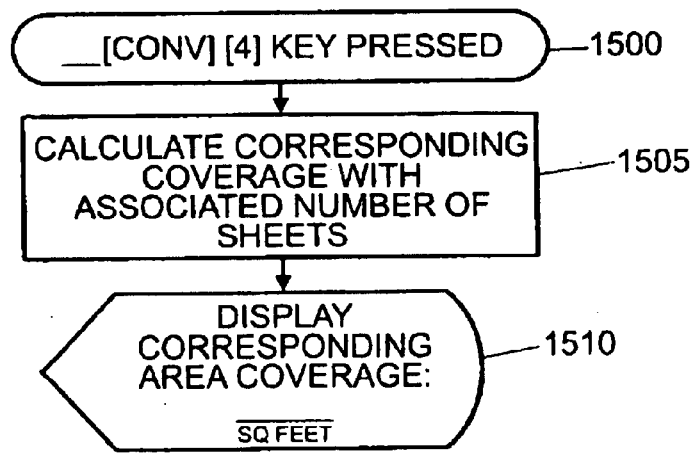
Figure 16:
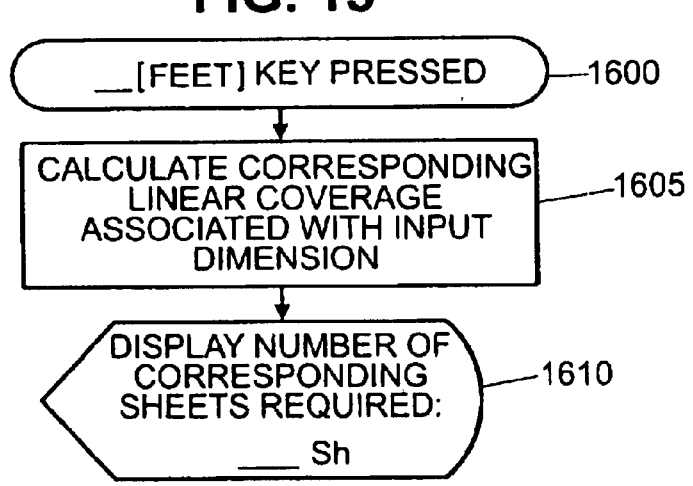

Referencing FIGS. 14, 15 and 16, shown are flowcharts which detail the basic operation of the 4×8 sheet functions. Referring to FIG. 14, the 4×8 sheet function is accessed through the [Conv] [4] keys. The user enters (or calculates to) a squared dimension 1400. Next the [Conv] [4] key is pressed 1405. The calculator then converts the entered area value to a number of 4×8 sheets bricks based on a conversion factors 1410. The calculator then displays the appropriate number of 4×8 sheets required 1415, along with indicator "Sh."

Referencing FIG. 15, the calculator can calculate the reverse as well, i.e., the user can enter a number of 4×8 sheets and the calculator indicates the coverage said number of sheets enjoy. The user enters the number of sheets and presses the [Conv] [4] key 1500. The calculator then converts the entered number of 4×8 sheets into a corresponding area 1505. The calculator then displays the area coverage: "SQ FEET" 1510.

Referencing FIG. 16, corresponding 4×8 sheets for an entered linear dimension can be calculated. A linear dimension is input 1600, then the 4×8 sheet function is accessed by pressing the [Conv] [4] key 1605. The calculator then converts the input distance into the required number of 4×8 sheets 1610 and displays the number of sheets 1610 with the designation "Sh."

Paint Function

Figure 17:
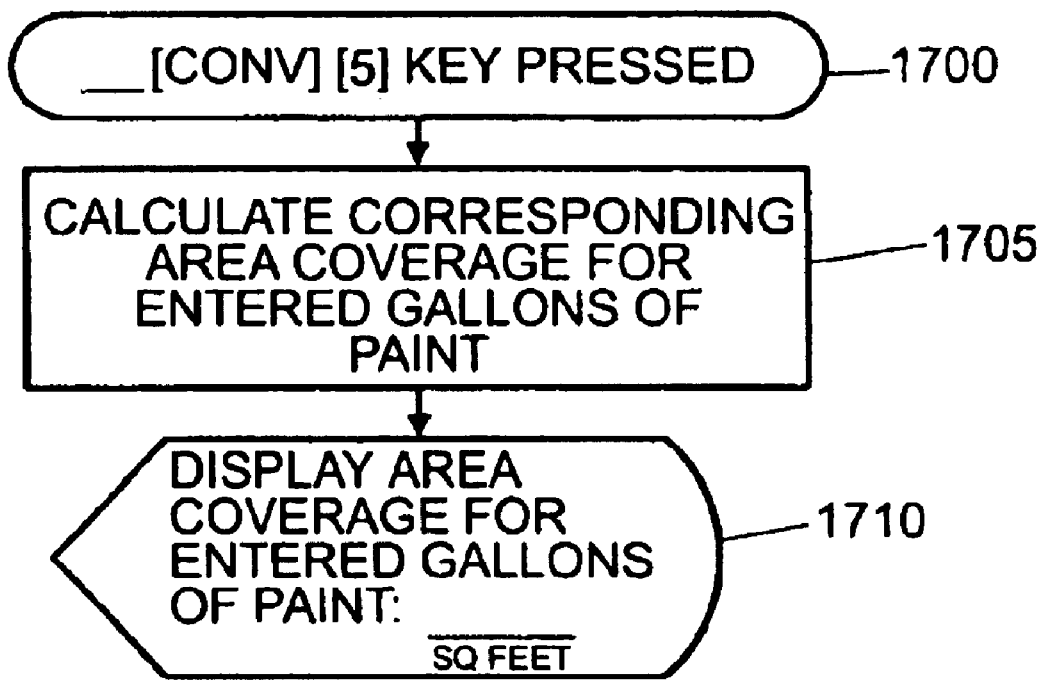
Figure 18:
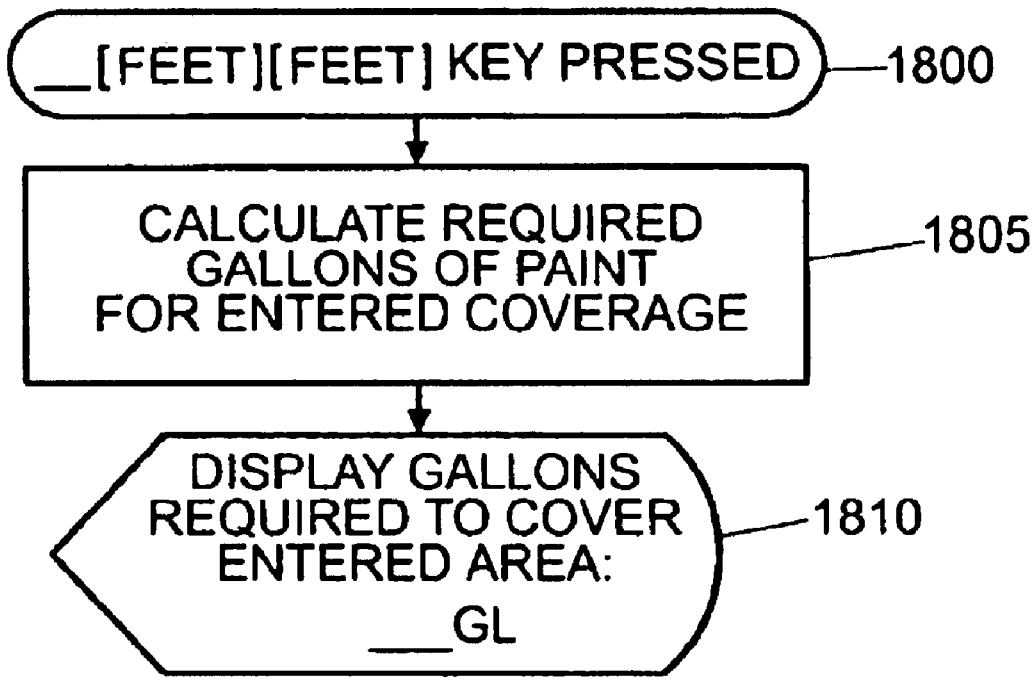

Referencing FIGS. 17 and 18, shown are flowcharts which detail the basic operation of the paint function. Referring to FIG. 17, the paint function is accessed through the [Conv] [5] keys. The user enters the number of gallons of paint and presses the [Conv] [5] key 1700. The calculator then converts the entered number of gallons of paint to an area value based on a conversion factor 1705. The calculator displays the value in square feet 1710. The conversion factor is 1 gallon of paint for 350 square feet.

Referencing FIG. 18, the calculator can calculate the reverse as well, i.e., the user can enter an area and the calculator indicates the gallons of paint required to cover that area. The user enters or calculates to the area and presses the [Conv] [5] key 1800. The calculator then converts the area into the corresponding gallons of paint 1805. The calculator then displays the number of gallons with the indicator "GL" 1810.

Wallpaper Function

Figure 19:
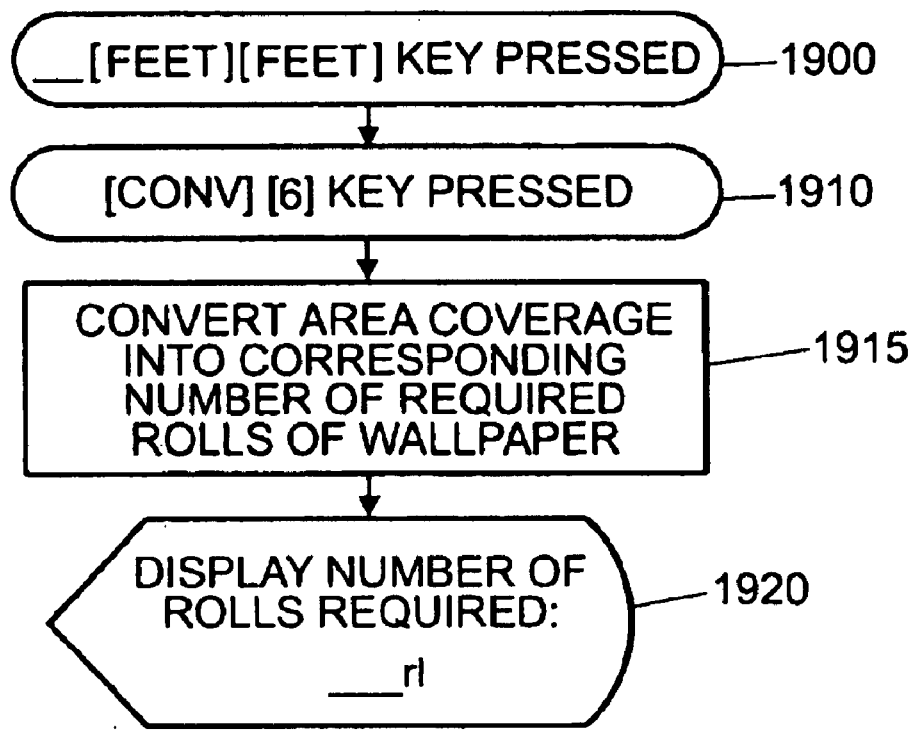
Figure 20:
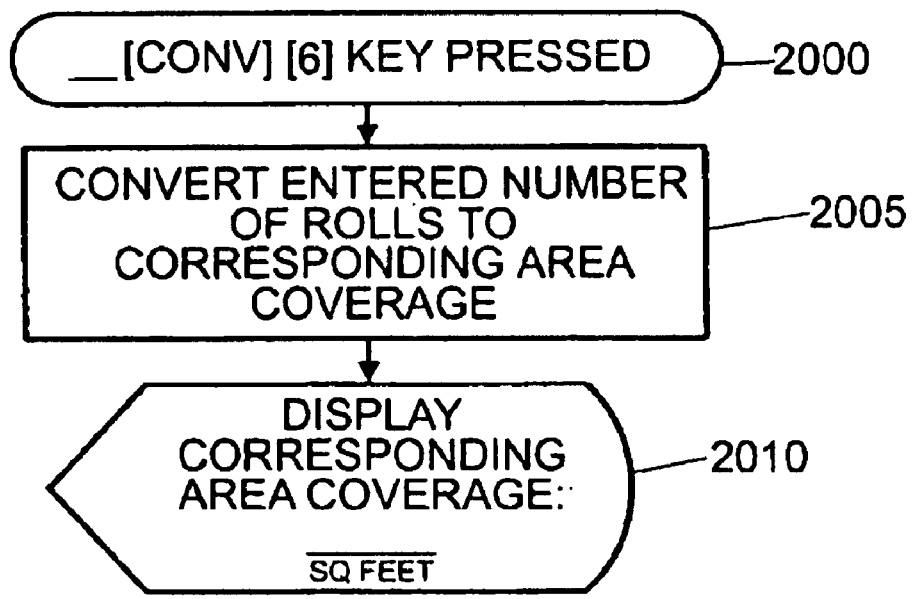

Referencing FIGS. 19 and 20, shown are flowcharts which detail the basic operation of the wallpaper function. Referring to FIG. 19, the wallpaper function is accessed through the [Conv] [6] keys. The user enters (or calculates) to a desired area 1900 and presses the [Conv] [6] key 1910. The calculator then converts the area dimension into rolls of wallpaper based on a conversion factor 1915. One roll covers 56 sq. feet. The calculator displays the number of rolls required to cover the input area with the designation "rl" 1920.

Referencing FIG. 20, the calculator can calculate the reverse as well, i.e., the user can enter a number of wallpaper rolls area and the calculator indicates the area the input rolls enjoy. The user enters the number of rolls and presses the [Conv] [6] key 2000. The calculator then converts the rolls into an area coverage 2005 and displays that area 2010 with the indicator "SQ FEET."

Stud Function

Figure 21:
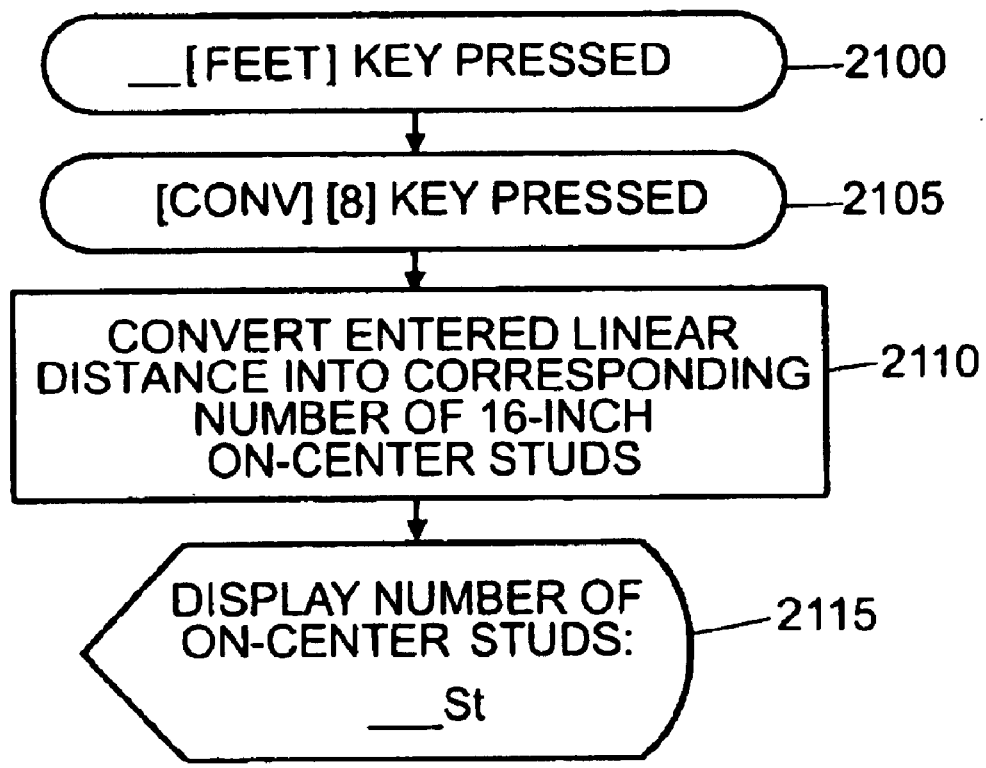
Figure 22:
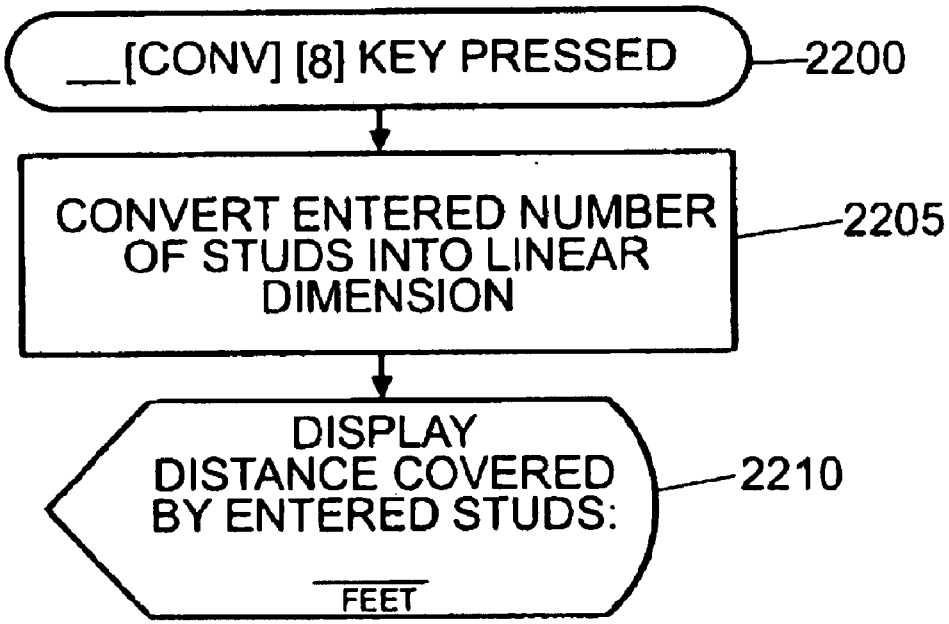

Referencing FIGS. 21 and 22, shown are flowcharts which detail the basic operation of the stud function. Referring to FIG. 21, the stud function is accessed through the [Conv] [8] keys. The user enters (or calculates) a desired linear distance 2100 and presses the [Conv] [8] key 2105. The calculator then converts the linear distance into number of studs based on a conversion factor 2110. One stud is required for every 16 inches of length. The calculator displays the number of studs required to cover the input area with the designation "St" 2115.

Referencing FIG. 22, the calculator can calculate the reverse as well, i.e., the user can enter a number of studs and the calculator indicates the length the input studs will cover. The user enters the number of studs and presses the [Conv] [8] key 2200. The calculator then converts the rolls into an linear distance 2205 and displays that area 2210 with the indicator "FEET."

Roofing Bundle Function

Figure 23:
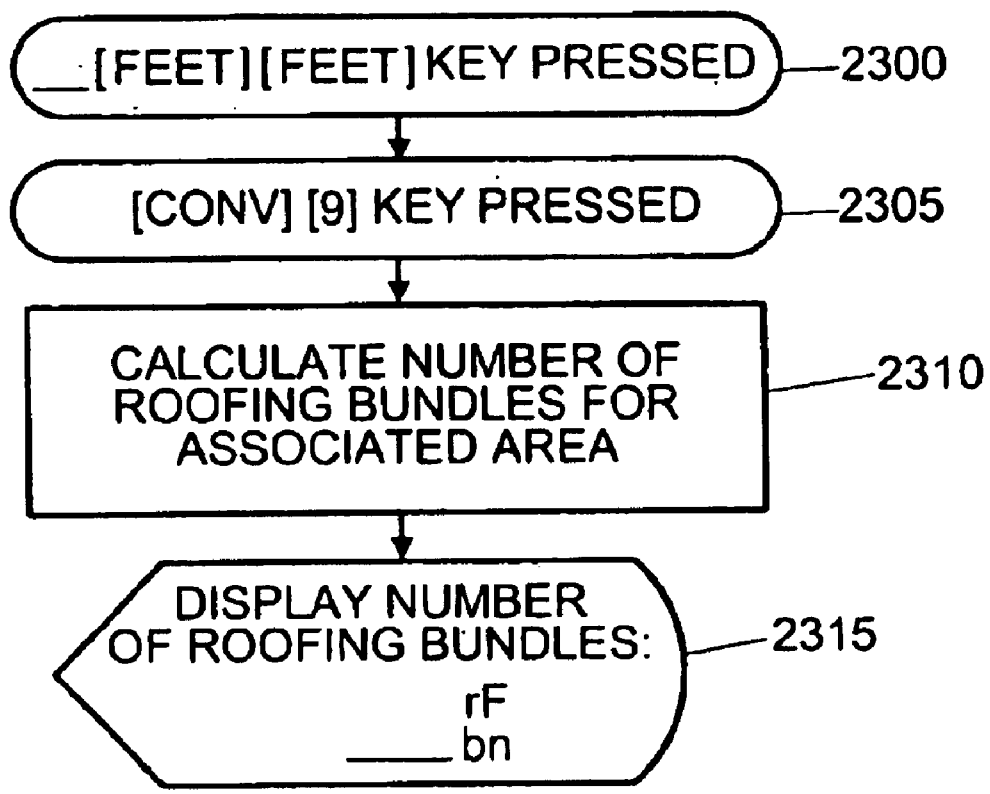
Figure 24:
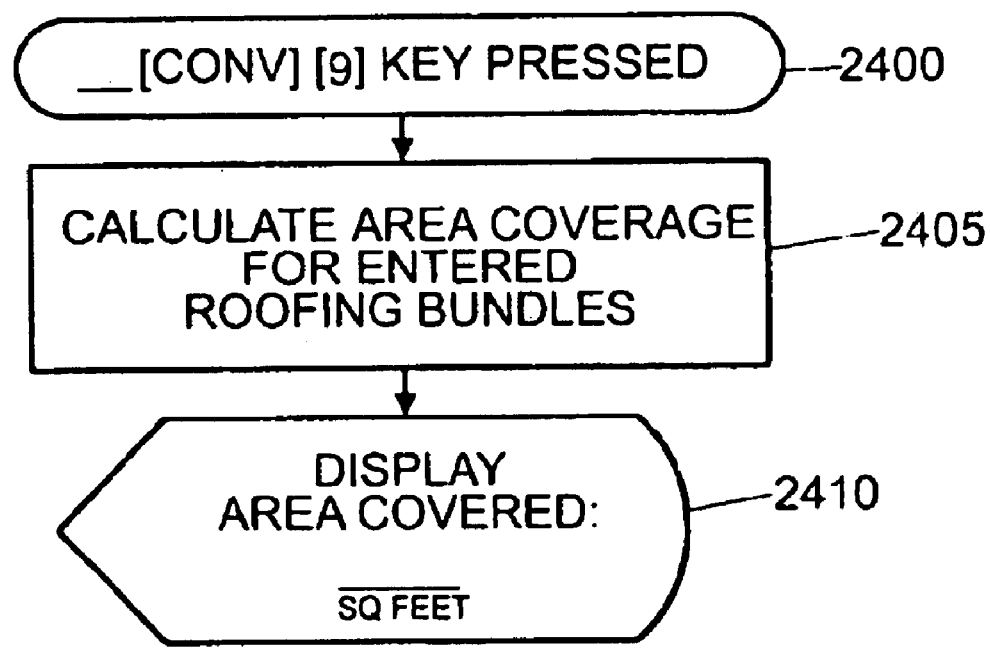

Referencing FIGS. 23 and 24, shown are flowcharts which detail the basic operation of the roofing bundle function. Referring to FIG. 23, the roofing bundle function is accessed through the [Conv] [8] keys. The user enters (or calculates) to a desired area 2300 and presses the [Conv] [8] key 2305. The calculator then converts the area dimension into roofing bundles based on a conversion factor 2310. One roofing bundle covers 33.33 sq. feet. The calculator displays the number of roofing bundles required to cover the input area with the designation "rf bn" 2315.

Referencing FIG. 24, the calculator can calculate the reverse as well, i.e., the user can enter a number of roofing bundles and the calculator indicates the area the input rolls enjoy. The user enters the number of rolls and presses the [Conv] [8] key 2400. The calculator then converts the bundles into an area coverage 2405 and displays that area 2410 with the indicator "SQ FEET."

Adjustable Features

The calculator can also be designed with an adjustable conversion features for adjusting the default conversion factors used with the above keys. The user can access the conversion key via the [Conv] key in conjunction with another key e.g. the [Conv] [+]. The user accesses the conversion factors by scrolling through the menu with the [+] or [−] minus key and then adjusting those factors to the users liking by keying in the appropriate value on the keyboard. Changeable factors include the gravel weight to volume ratio; concrete weight to volume ratio; tile with a "grout/no grout" option; i.e., the tile area can be calculated with or without grout. The brick area can be calculated with "mortar/no mortar." The paint gallon to coverage area ratio can be adjusted. The wallpaper roll to area ratio can also be adjusted as well as the stud spacing.

The calculator can also be designed with scrollable choices for the user to select from a variety of gravel weight to volume ratios and concrete weight to volume ratios. Additionally, the calculator can be designed to calculate and display additional concrete values such as amount of aggregate, sand, water and lime required for an input cubic volume.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

What is claimed is:

1. A calculator specially adapted to perform calculations and conversions of dimensional data for making home improvement calculations comprising in combination:

means responsive to a specific user key for calculating data related to one of gravel, concrete, tile, brick, block, 4×8 sheet, paint, wallpaper, stud and roofing bundle calculations, and;

means for displaying said data related to one of gravel, concrete, tile, brick, block, 4×8 sheet, paint, wallpaper, stud and roofing bundle calculations.

2. The calculator of claim 1 wherein said means for determining data related to said gravel calculations allows for the conversion of a cubic dimension into a weight measurement based on a preset weight to volume ratio.

3. The calculator of claim 1 wherein said means for determining data related to said gravel calculations allows for the conversion of a weight measurement into a dimensional measurement based on a preset weight to volume ratio.

4. The calculator of claim 1 wherein said means for determining data related to said gravel calculations allows for the conversion of a cubic dimension into a weight measurement based on a user defined weight to volume ratio.

5. The calculator of claim 1 wherein said means for determining data related to said gravel calculations allows for the conversion of a weight measurement into a cubic dimension based on a user defined weight to volume ratio.

6. The calculator of claim 1 wherein said means for determining data related to said gravel calculations allows for the conversion of a cubic dimension into a weight measurement based on a weight to volume ratio chosen from a user selectable pre-set scrollable list.

7. The calculator of claim 1 wherein said means for determining data related to said gravel calculations allows for the conversion of a weight measurement into a cubic dimension based on a weight to volume ratio chosen from a user selectable pre-set scrollable list.

8. The calculator of claim 1 wherein said means for determining data related to said gravel calculations allows for the conversion of a cubic dimension into a weight measurement based on a weight to volume ratio chosen from a user selectable user set scrollable list.

9. The calculator of claim 1 wherein said means for determining data related to said gravel calculations allows for the conversion of a weight measurement into a cubic dimension based on a weight to volume ratio chosen from a user selectable pre-set scrollable list.

10. The calculator of claim 1 wherein said means for determining data related to said concrete calculations allows for the conversion of a cubic dimension into bags of cement based on either a pre-set or user defined weight to volume ratio.

11. The calculator of claim 1 wherein said means for determining data related to said concrete calculations allows for the conversion of bags of cement into a cubic dimension based on either a pre-set or user defined weight to volume ratio.

12. The calculator of claim 1 wherein said means for determining data related to said concrete calculations allows for the conversion of a cubic dimension into bags of cement, sand, aggregate and water based on either pre-set or user defined ratios.

13. The calculator of claim 1 wherein said means for determining data related to said tile calculations allows for the conversion of an area dimension into a number of tiles.

14. The calculator of claim 1 wherein said means for determining data related to said tile calculations allows for the conversion of a number of tiles into an area dimension.

15. The calculator of claim 1 wherein said means for determining data related to said tile calculations allows for the conversion of an area dimension into a number of tiles based on a scrollable list of tile sizes.

16. The calculator of claim 1 wherein said means for determining data related to said tile calculations allows for the conversion of a number of tiles into an area dimension based on a scrollable list of tile sizes.

17. The calculator of claim 1 wherein said means for determining data related to said brick calculations allows for the conversion of a number of bricks into an area dimension based on either the face or paver use of the brick.

18. The calculator of claim 1 wherein said means for determining data related to said brick calculations allows for the conversion of an area dimension into a number of bricks based on either the face or paver use of the brick.

19. The calculator of claim 1 wherein said means for determining data related to said brick calculations allows for the conversion of a linear dimension into a number of bricks based on either the face or paver use of the brick.

20. The calculator of claim 1 wherein said means for determining data related to said block calculations allows for the conversion of a number of blocks into an area dimension.

21. The calculator of claim 1 wherein said means for determining data related to said block calculations allows for the conversion of an area dimension into a number of blocks.

22. The calculator of claim 1 wherein said means for determining data related to said block calculations allows for the conversion of a linear dimension into a number of blocks.

23. The calculator of claim 1 wherein said means for determining data related to said 4×8 sheet calculations allows for the conversion of a number of 4×8 sheets into an area dimension.

24. The calculator of claim 1 wherein said means for determining data related to said 4×8 sheet calculations allows for the conversion of an area dimension into a number of 4×8 sheets.

25. The calculator of claim 1 wherein said means for determining data related to said 4×8 sheet calculations allows for the conversion of a linear dimension into a number of 4×8 sheets.

26. The calculator of claim 1 wherein said means for determining data related to said paint calculations allows for the conversion of a number of gallons of paint into an area dimension.

27. The calculator of claim 1 wherein said means for determining data related to said paint calculations allows for the conversion of an area dimension into a number of gallons.

28. The calculator of claim 1 wherein said means for determining data related to said wallpaper calculations allows for the conversion of a number of rolls of wallpaper into an area dimension.

29. The calculator of claim 1 wherein said means for determining data related to said wallpaper calculations allows for the conversion of an area dimension into a number of rolls of wallpaper.

30. The calculator of claim 1 wherein said means for determining data related to said stud calculations allows for the conversion of a linear dimension into a number of studs.

31. The calculator of claim 1 wherein said means for determining data related to said stud calculations allows for the conversion of a number of studs into a linear dimension.

32. The calculator of claim 1 wherein said means for determining data related to said roofing bundle calculations allows for the conversion of an area dimension into a number of roofing bundles.

33. The calculator of claim 1 wherein said means for determining data related to said roofing bundle calculations allows for the conversion of a number of roofing bundles into an area dimension.

* * * * *

(12) EX PARTE REEXAMINATION CERTIFICATE (7828th)

United States Patent
Diamond et al.

(10) Number: US 6,721,623 C1
(45) Certificate Issued: Oct. 26, 2010

(54) WOODWORKING AND HOME IMPROVEMENTS CALCULATOR

(75) Inventors: Michael A. Diamond, Carson City, NV (US); Steven C. Kennedy, Carson City, NV (US); Joel S. Novak, Sudbury, MA (US); Kenneth M. Steiner, Sudbury, MA (US)

(73) Assignee: Construction Master Technologies, Inc., Carson City, NV (US)

Reexamination Request:
No. 90/008,298, Jan. 25, 2007

Reexamination Certificate for:
Patent No.: 6,721,623
Issued: Apr. 13, 2004
Appl. No.: 09/607,687
Filed: Jun. 30, 2000

(51) Int. Cl.
*G06F 15/02* (2006.01)
*G06F 19/00* (2006.01)

(52) U.S. Cl. .................. 700/194; 708/200; 708/142; 33/494; D18/7

(58) Field of Classification Search .............. None
See application file for complete search history.

(56) References Cited

U.S. PATENT DOCUMENTS 6,295,544 B1 * 9/2001 Cheung ............... 708/134

OTHER PUBLICATIONS

ConcreteCalc User's Guide; Date: 1995; Publisher, Calculated Industries, Inc., Carson City, US.
Construction Master II; Date: on or before Jun. 19, 2000; Publisher, Calculated Industries, Inc., Carson City, US.
Construction Master III; Date: on or before Jun. 19; Publisher Calculated Industries, Inc., Carson City, Nevada, US.
Construction Master IV; Date: on or before Jun. 19; Publisher Calculated Industries, Inc., Carson City, Nevada, US.

* cited by examiner

*Primary Examiner*—Deandra M Hughes

(57) ABSTRACT

The specification discloses a woodworking and home improvement calculator particularly adopted for symplifying common home improvement calculations. The calculator includes a variety of special keys including a gravel, cement, tile, brick, block, 4×8 sheet, paint, wallpaper, stud and roof bundle keys which allow the user to quickly determine the amount of materials needed for projects involving the aforementioned keys.

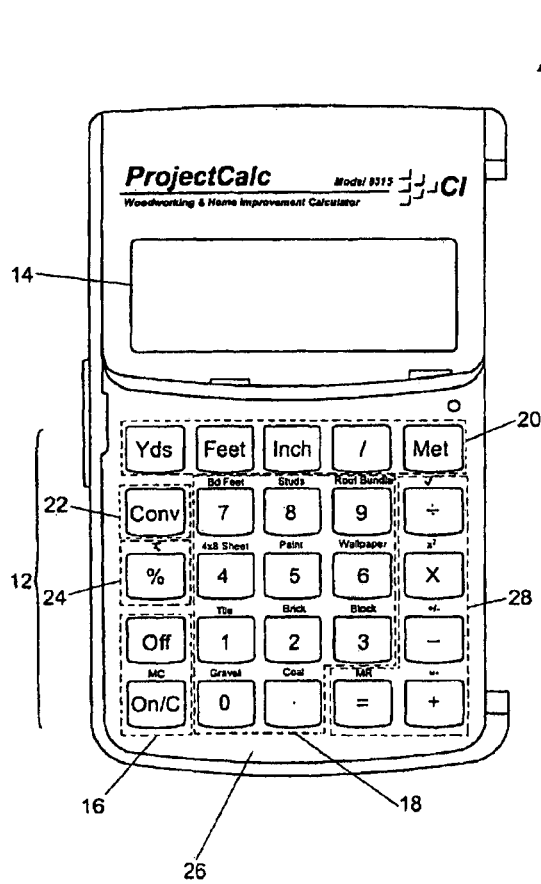

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-33 are cancelled.

\* \* \* \* \*